US010447591B2

United States Patent
Cohn et al.

(10) Patent No.: US 10,447,591 B2
(45) Date of Patent: Oct. 15, 2019

(54) EXECUTING MULTIPLE VIRTUAL PRIVATE NETWORK (VPN) ENDPOINTS ASSOCIATED WITH AN ENDPOINT POOL ADDRESS

(71) Applicant: Oracle International Corporation, Redwood Shores, CA (US)

(72) Inventors: Daniel Cohn, Oakland, CA (US); Peter John Hill, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 80 days.

(21) Appl. No.: 15/252,023

(22) Filed: Aug. 30, 2016

(65) Prior Publication Data

US 2018/0062992 A1 Mar. 1, 2018

(51) Int. Cl.
*H04L 12/46* (2006.01)
*H04L 29/06* (2006.01)
(Continued)

(52) U.S. Cl.
CPC .......... *H04L 45/74* (2013.01); *H04L 12/4633* (2013.01); *H04L 12/4641* (2013.01);
(Continued)

(58) Field of Classification Search
CPC . H04L 12/4633; H04L 12/4641; H04L 45/00; H04L 45/586; H04L 45/64;
(Continued)

(56) References Cited

U.S. PATENT DOCUMENTS 7,299,294 B1 * 11/2007 Bruck ............... H04L 29/12216
709/201
7,463,588 B1 * 12/2008 Tanaka ................ H04L 12/4641
370/238
(Continued)

FOREIGN PATENT DOCUMENTS

EP 3115897 A1 * 1/2017 ......... H04L 67/1002
WO WO-2015175671 A1 * 11/2015 ......... H04L 67/1017
(Continued)

*Primary Examiner* — Eric Nowlin
(74) *Attorney, Agent, or Firm* — Invoke

(57) ABSTRACT

Techniques for executing multiple Virtual Private Network (VPN) endpoints associated with an Endpoint Pool Address are disclosed. A VPN endpoint manager determines traffic attributes of traffic addressed to the Endpoint Pool Address. The VPN endpoint manager selects a quantity of VPN endpoints to be executed for processing the traffic based on the traffic attributes. The VPN endpoint manager causes execution of a plurality of VPN endpoints corresponding to the selected quantity. The VPN endpoint manager selects one VPN endpoint, from the VPN endpoint pool, to process each data packet addressed to the Endpoint Pool Address. The VPN endpoint manager may select different VPN endpoints to process data packets of different VPN sessions. The VPN endpoint manager may transfer a VPN session from one VPN endpoint to another VPN endpoint. The VPN endpoints in the VPN endpoint pool operate concurrently to process data packets addressed to the Endpoint Pool Address.

18 Claims, 8 Drawing Sheets

(51) Int. Cl.
*H04L 12/713* (2013.01)
*H04L 12/741* (2013.01)
*H04L 12/801* (2013.01)
*H04L 12/947* (2013.01)

(52) U.S. Cl.
CPC ............ *H04L 45/586* (2013.01); *H04L 47/18* (2013.01); *H04L 49/252* (2013.01); *H04L 69/22* (2013.01)

(58) Field of Classification Search
CPC ....... H04L 45/74; H04L 47/125; H04L 47/18; H04L 47/70; H04L 49/252; H04L 61/2592; H04L 63/0272; H04L 67/10; H04L 67/1002; H04L 67/1036; H04L 69/22; H04L 2212/00; H04W 28/08
See application file for complete search history.

(56) References Cited

U.S. PATENT DOCUMENTS

| | | | | |
|---|---|---|---|---|
| 7,516,216 | B2* | 4/2009 | Ginsberg | H04L 43/50 703/13 |
| 8,443,435 | B1 | 5/2013 | Schroeder | |
| 8,495,131 | B2* | 7/2013 | Ahuja | G06F 9/52 709/203 |
| 8,549,286 | B2* | 10/2013 | Liu | H04L 12/4675 713/153 |
| 8,849,971 | B2* | 9/2014 | Ferris | G06F 9/5077 709/203 |
| 8,942,242 | B2* | 1/2015 | Weill | H04L 12/4633 370/389 |
| 9,246,876 | B1 | 1/2016 | Melam et al. | |
| 9,253,245 | B2* | 2/2016 | Wood | H04L 67/02 |
| 9,300,570 | B2 | 3/2016 | Hengeveld | |
| 9,369,550 | B2 | 6/2016 | Sung et al. | |
| 9,389,901 | B2* | 7/2016 | Saladi | G06F 9/45558 |
| 9,531,565 | B2 | 12/2016 | Ng et al. | |
| 9,544,364 | B2* | 1/2017 | Jalan | H04L 67/1002 |
| 9,571,458 | B1 | 2/2017 | Melam et al. | |
| 9,590,820 | B1* | 3/2017 | Shukla | H04L 12/4633 |
| 9,736,278 | B1* | 8/2017 | Hammam | H04L 69/22 |
| 9,749,401 | B2* | 8/2017 | Patil | H04L 67/1002 |
| 9,774,667 | B2* | 9/2017 | Bhagwat | H04L 41/0803 |
| 9,807,057 | B1 | 10/2017 | Deb et al. | |
| 9,813,343 | B2* | 11/2017 | Williams | H04L 47/125 |
| 9,825,912 | B2* | 11/2017 | Lopez | H04L 63/0218 |
| 9,853,942 | B2* | 12/2017 | Lopez | H04L 63/0218 |
| 9,888,041 | B2* | 2/2018 | Roth | H04L 63/205 |
| 10,084,751 | B2* | 9/2018 | Lopez | H04L 63/0218 |
| 2003/0179775 | A1* | 9/2003 | Carolan | H04L 29/06 370/469 |
| 2004/0068563 | A1* | 4/2004 | Ahuja | G06F 9/52 709/225 |
| 2008/0198858 | A1* | 8/2008 | Townsley | H04L 12/4641 370/401 |
| 2009/0300407 | A1 | 12/2009 | Kamath et al. | |
| 2011/0194563 | A1* | 8/2011 | Shen | G06F 9/45558 370/395.52 |
| 2012/0066371 | A1* | 3/2012 | Patel | H04L 67/1031 709/224 |
| 2012/0066487 | A1* | 3/2012 | Brown | G06F 9/5083 713/150 |
| 2013/0142201 | A1* | 6/2013 | Kim | H04L 12/4645 370/392 |
| 2013/0159487 | A1* | 6/2013 | Patel | H04L 67/1031 709/223 |
| 2013/0170502 | A1 | 7/2013 | Chen et al. | |
| 2014/0003246 | A1 | 1/2014 | Han et al. | |
| 2014/0071830 | A1* | 3/2014 | Weill | H04L 12/4633 370/241 |
| 2014/0280969 | A1* | 9/2014 | Wood | H04L 67/02 709/226 |
| 2015/0134822 | A1* | 5/2015 | Bhagwat | H04L 41/0803 709/226 |
| 2015/0188823 | A1* | 7/2015 | Williams | H04L 47/125 370/235 |
| 2015/0222515 | A1* | 8/2015 | Mimura | H04L 43/0876 709/224 |
| 2015/0234668 | A1* | 8/2015 | Ravinoothala | G06F 9/45558 718/1 |
| 2015/0281408 | A1 | 10/2015 | Kwan et al. | |
| 2015/0358281 | A1 | 12/2015 | Chen et al. | |
| 2016/0014126 | A1* | 1/2016 | Jalan | H04L 63/0892 726/7 |
| 2016/0070587 | A1* | 3/2016 | Saladi | G06F 9/45558 718/1 |
| 2016/0173382 | A1* | 6/2016 | Korosi | H04L 47/125 370/235 |
| 2016/0173579 | A1* | 6/2016 | Jalan | H04L 67/1002 709/203 |
| 2016/0191310 | A1* | 6/2016 | Brandwine | H04L 12/4641 709/220 |
| 2016/0205179 | A1* | 7/2016 | Cui | G06F 9/5083 709/226 |
| 2016/0212098 | A1 | 7/2016 | Roch | |
| 2016/0226755 | A1 | 8/2016 | Hammam et al. | |
| 2016/0301758 | A1* | 10/2016 | Said | H04L 67/142 |
| 2016/0359806 | A1* | 12/2016 | Lopez | H04L 63/0218 |
| 2016/0359808 | A1* | 12/2016 | Lopez | H04L 63/0218 |
| 2016/0378526 | A1* | 12/2016 | Venkataramaiah | G06F 9/45558 718/1 |
| 2017/0013049 | A1* | 1/2017 | Patil | H04L 67/1002 |
| 2017/0111441 | A1* | 4/2017 | Jalan | H04L 67/1002 |
| 2017/0195180 | A1 | 7/2017 | Ng et al. | |
| 2017/0223154 | A1* | 8/2017 | Hammam | H04L 12/4641 |
| 2017/0249188 | A1* | 8/2017 | Saladi | G06F 9/505 |
| 2017/0272554 | A1 | 9/2017 | Kwan et al. | |
| 2017/0295100 | A1* | 10/2017 | Hira | H04L 43/0864 |
| 2017/0324809 | A1* | 11/2017 | Patil | H04L 67/10 |
| 2017/0346762 | A1* | 11/2017 | Lapidous | H04L 1/16 |
| 2017/0359311 | A1* | 12/2017 | Chen | H04L 63/20 |
| 2018/0054421 | A1 | 2/2018 | Deb et al. | |
| 2018/0069797 | A1* | 3/2018 | Williams | H04L 47/125 |
| 2018/0077118 | A1* | 3/2018 | Lopez | H04L 63/0218 |
| 2018/0232284 | A1 | 8/2018 | Tormasov | |
| 2018/0241720 | A1* | 8/2018 | Healy | H04L 63/0245 |
| 2018/0241809 | A1* | 8/2018 | Gandhi | H04L 67/1008 |
| 2018/0324109 | A1* | 11/2018 | Lapidous | H04L 1/16 |
| 2019/0007368 | A1 | 1/2019 | Hooda et al. | |

FOREIGN PATENT DOCUMENTS

| | | | | |
|---|---|---|---|---|
| WO | WO-2016040357 A2 * | 3/2016 | ......... | G06F 9/45558 |
| WO | WO-2016040357 A3 * | 5/2016 | ......... | G06F 9/45558 |
| WO | WO-2017180731 A1 * | 10/2017 | ......... | H04L 43/0864 |

* cited by examiner

EXECUTING MULTIPLE VIRTUAL PRIVATE NETWORK (VPN) ENDPOINTS ASSOCIATED WITH AN ENDPOINT POOL ADDRESS

TECHNICAL FIELD

The present disclosure relates to computer networks. In particular, the present disclosure relates to executing multiple virtual private network (VPN) endpoints associated with an Endpoint Pool Address.

BACKGROUND

A computer network provides connectivity among a set of nodes. The set of nodes are connected by a set of links. The nodes may be local to and/or remote from each other. A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may provide connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Such a computer network may be referred to as a "cloud network."

A virtual private network (VPN) is a private network that extends across a public network, such as the Internet. Nodes of the VPN may transmit data across the public network as if directly connected to a private network. A direct virtual connection is implemented through a tunneling technique. On the transmission side of a VPN tunnel, data packets are encapsulated using an additional header and/or additional tail. The encapsulated data packets are transmitted via the underlying public network. Nodes of the underlying public network route the encapsulated data packets based on the additional header and/or additional tail. Nodes of the underlying public network may be but are not necessarily aware of the contents of the original data packet. On the receiving side of the VPN tunnel, the encapsulated data packets are decapsulated. The additional header and/or additional tail are removed to obtain the original data packet.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
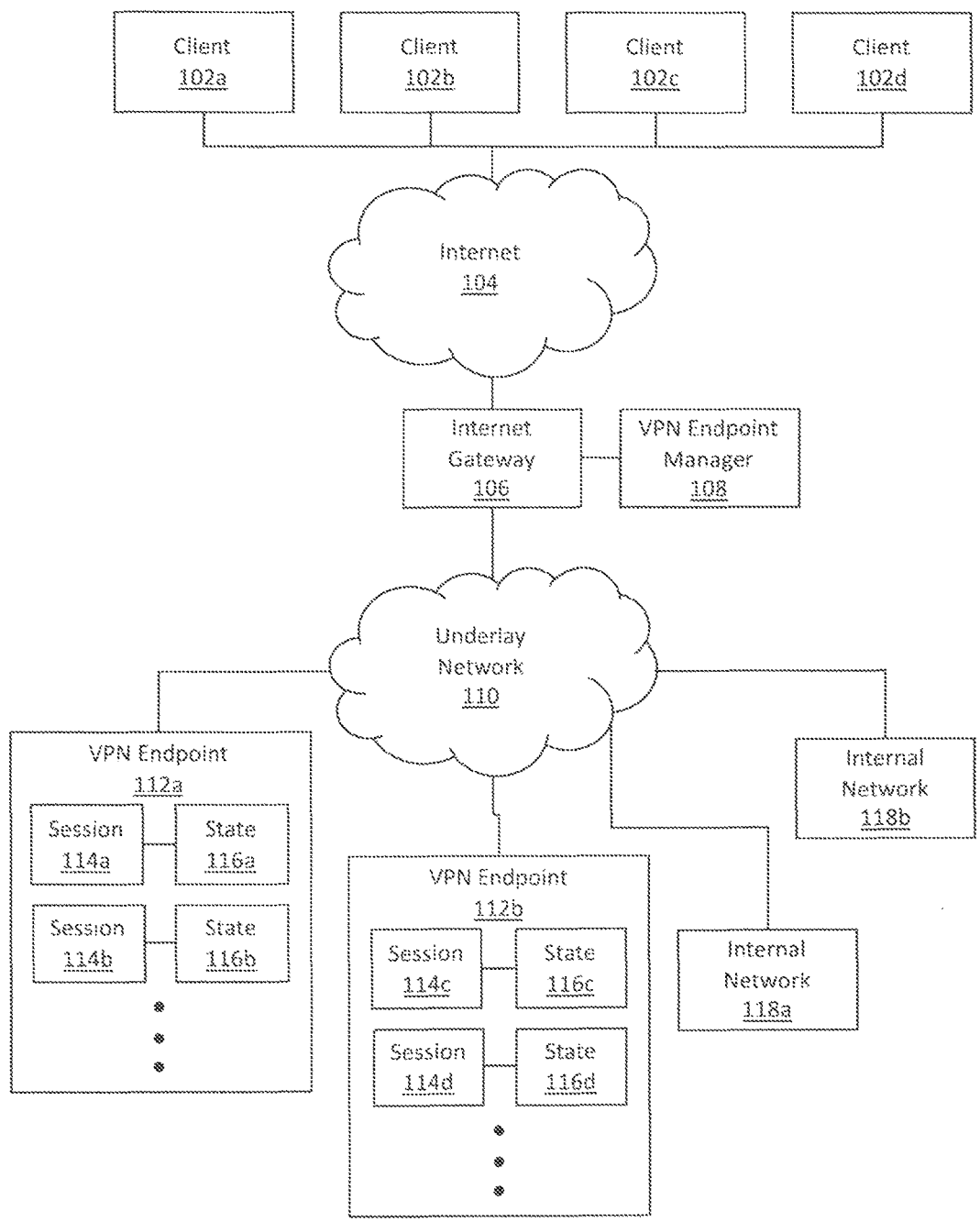
FIG. 1 illustrates an interconnection of networks, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. VPN ENDPOINT MANAGEMENT SYSTEM ARCHITECTURE
3. SELECTING A QUANTITY OF VPN ENDPOINTS FOR PROCESSING TRAFFIC
4. TRANSMITTING DATA PACKETS OF A VPN SESSION TO A PARTICULAR VPN ENDPOINT
5. TRANSFERRING A VPN SESSION FROM ONE VPN ENDPOINT TO ANOTHER VPN ENDPOINT
6. EXAMPLE EMBODIMENTS
7. COMPUTER NETWORKS AND CLOUD NETWORKS
8. MISCELLANEOUS; EXTENSIONS
9. HARDWARE OVERVIEW

1. General Overview

One or more embodiments include executing multiple virtual private network (VPN) endpoints, each associated with a same particular address (referred to as the "Endpoint Pool Address"). An Internet gateway, that provides access to a computer network, receives data packets from one or more clients. The data packets are addressed to an Endpoint Pool Address. A VPN endpoint manager (which is communicatively coupled to or a component of the Internet gateway) distributes the data packets across multiple VPN endpoints for processing. The VPN endpoints are used to implement one or more VPN tunnels connecting the clients and the computer network. The use of multiple VPN endpoints, as opposed to a single VPN endpoint, may improve scaling, resiliency, efficiency, performance, and/or other network goals. As an example, a level of traffic transmitted by multiple clients to a computer network may exceed the capacity of a single VPN endpoint. If a single VPN endpoint were used, then the data packets may need to be placed in a queue. By using a VPN endpoint pool including multiple VPN endpoints, the data packets may be distributed across the multiple VPN endpoints. The multiple VPN endpoints may concurrently operate to process the data packets in parallel fashion.

One or more embodiments include selecting a quantity of VPN endpoints for a VPN endpoint pool. A VPN endpoint manager determines a level of traffic addressed to an Endpoint Pool Address. Based on the level of traffic, the VPN endpoint manager selects a quantity of VPN endpoints to be executed for processing the traffic. As an example, the selected quantity of VPN endpoints is directly proportional to the level of traffic.

One or more embodiments include selecting a particular VPN endpoint for processing data packets of a VPN session, in accordance with one or more embodiments. A VPN endpoint manager receives a data packet addressed to an Endpoint Pool Address. If the data packet is associated with a current VPN session, then the VPN endpoint manager selects a VPN endpoint, from a VPN endpoint pool, that is associated with the current VPN session. If the data packet is not associated with a current VPN session, then the VPN endpoint manager selects a VPN endpoint, from a VPN endpoint pool, based on an endpoint selection algorithm. The endpoint selection algorithm may be based on hashing, load balancing, attributes of the data packet, and/or other factors. The data packet is transmitted toward the selected VPN endpoint. Different VPN endpoints may be selected for data packets corresponding to different VPN sessions.

One or more embodiments include transferring a VPN session from one VPN endpoint to another VPN endpoint. A VPN endpoint manager determines whether a level of traffic being transmitted to a particular VPN endpoint, of a VPN endpoint pool, exceeds a threshold value. If the level of traffic exceeds the threshold value, then the VPN endpoint manager initiates a transfer process. The VPN endpoint manager identifies a VPN session to be transferred from the particular VPN endpoint. The VPN endpoint manager selects a target VPN endpoint for transferring the VPN session. The VPN endpoint manager transmits a state of the VPN session from the particular VPN endpoint to the target VPN endpoint. The VPN endpoint manager directs traffic of the VPN session to the target VPN endpoint, rather than the particular VPN endpoint. Throughout the transfer process, clients transmitting traffic corresponding to the VPN session continue to address the data packets to the Endpoint Pool Address. The clients may be unaware of the transfer of the VPN session from one VPN endpoint to another VPN endpoint as the clients continue to communicate using a same Endpoint Pool Address.

In an embodiment, a VPN endpoint manager transfers a VPN session in order to load balance VPN endpoints. The VPN endpoint manager identifies a VPN session to be transferred from a particular VPN endpoint. The VPN endpoint manager selects a target VPN, for transferring the VPN session, based on the loads of the VPN endpoints. As an example, the target VPN may be associated with a smallest load, as compared with other VPN endpoints in the VPN endpoint pool. As another example, the target VPN endpoint may be associated with a load that is less than a threshold value. The VPN endpoint manager transmits the state of the VPN session from the particular VPN endpoint to the target VPN endpoint. The VPN endpoint manager directs traffic of the VPN session to the target VPN endpoint, rather than the particular VPN endpoint.

One or more embodiments described in this Specification and/or recited in the claims may not be included in this General Overview section.

2. VPN Endpoint Management System Architecture

FIG. 1 illustrates an interconnection of networks, in accordance with one or more embodiments. As illustrated in FIG. 1, the interconnection of networks includes clients 102a-102d, the Internet 104, an Internet gateway 106, a VPN endpoint manager 108, an underlay network 110, VPN endpoints 112a-b, and internal networks 118a-118b. In one or more embodiments, the interconnection of networks may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, an underlay network 110 is a computer network that is shared amongst multiple clients (such as clients 102a-102d). The underlay network 110 provides connectivity between the clients and network resources. Network resources include hardware and/or software configured to execute server processes. Examples of network resources include a processor, a data storage, a virtual machine, a container, and/or a software application. Clients request computing services from a computer network independently of each other. Network resources are dynamically assigned to the requests and/or clients on an on-demand basis. Such a computer network may be referred to as a "cloud network."

As an example, an underlay network may provide connectivity between clients and network resources executing a Sales Application, a Human Resources Database, and/or other applications and/or processes. A client may request that a projected revenue be calculated by the Sales Application. Another client may request that a certain personnel record be added to the Human Resources Database. The requests may be transmitted through the underlay network to the network resources. The network resources may execute the requests. The network resources may transmit responses back to the clients, confirming that the requests have been completed. Additional embodiments and/or examples relating to cloud networks are described below in Section 7, titled "Computer Networks and Cloud Networks."

In one or more embodiments, a client (such as clients 102a-102d) is a device and/or process that makes a request for a computing service via an underlay network 110. A client may be local to and/or remote from the underlay network 110.

A client is implemented on one or more digital devices. The term "digital device" generally refers to any hardware device that includes a processor. A digital device may refer to a physical device executing an application or a virtual machine. Additionally or alternatively, a digital device may refer to a function-specific hardware device. Examples of digital devices include a computer, a tablet, a laptop, a desktop, a netbook, a server, a web server, a network policy server, a proxy server, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), and/or a wireless receiver and/or transmitter.

In an embodiment, clients accessing the underlay network 110 may correspond to multiple tenants of the underlay network 110. Each tenant (also referred to as a "customer") is an independent entity. The term "entity" generally refers to a corporation, organization, person, administrative group, or other entity. An underlay network 110 that is shared amongst multiple tenants may be referred to as a "multi-tenant computer network."

In one or more embodiments, the Internet 104 is an interconnection of computer networks that uses the Internet protocol suite (also known as, TCP/IP) for data transmission. The Internet 104 may be used to provide a connection between clients and an underlay network 110. The Internet is a public network that is accessible to clients corresponding to entities other than the tenants of the underlay network 110. Additionally or alternatively, other types of computer networks may be used to provide a connection between clients and an underlay network 110.

In one or more embodiments, an Internet gateway 106 is a gateway and/or a router between an underlay network 110 and the Internet 104. An Internet gateway 106 routes traffic between an underlay network 110 and the Internet 104. The Internet gateway 106 may also perform translation and/or conversions between the network protocols used by the underlay network 110 and the Internet 104. One or more Internet gateways 106 are used to provide the exclusive points of access to the underlay network 110. Additionally or alternatively, an alternative gateway and/or router may be implemented between the underlay network 110 and a computer network other than the Internet.

In one or more embodiments, each internal network (such as internal networks 118a-118b) is an overlay network implemented on a same underlay network 110. Each node in an internal network is implemented by a respective node in the underlay network 110. Hence, each node in an internal network is associated with both an overlay address (to address the node in the internal network) and an underlay address (to address the node in the underlay network 110 that implements the node in the internal network). Communications between nodes of an internal network are transmitted via tunnels through the underlay network 110. Tunneling is performed through encapsulation and decapsulation. Additional embodiments and/or examples relating to overlay networks are described below in Section 7, titled "Computer Networks and Cloud Networks."

Each internal network corresponds to a particular set of clients, which may correspond to a particular tenant of the underlay network 110. Each internal network provides connectivity between clients of a particular tenant and network resources of the particular tenant. The internal network and network resources thereof may process and/or store confidential information corresponding to the particular tenant. To maintain security and/or privacy, tenants may desire to connect to internal networks through a secure connection, such as a virtual private network (VPN). Multiple VPNs may be implemented to provide private connections between different clients and different internal networks implemented by an underlay network 110. Each VPN may correspond to a different tenant of the underlay network 110. The VPNs are implemented by VPN endpoints, as described below.

In one or more embodiments, a VPN endpoint (such as VPN endpoints 112a-b) refers to hardware and/or software configured to implement one or more VPN tunnels. A VPN tunnel provides a direct virtual connection between a client and an underlay network 110, even though the client and the underlay network 110 are connected by a public network such as the Internet 104.

Two VPN endpoints operate in conjunction to implement a VPN tunnel. A VPN endpoint on a transmission side of the VPN tunnel may be referred to as a "transmitting VPN endpoint." A VPN endpoint on a receiving side of the VPN tunnel may be referred to as a "receiving VPN endpoint." The transmitting VPN endpoint (such as a VPN endpoint associated with a client) encapsulates a data packet addressed to a destination host connected to the VPN. The transmitting VPN endpoint attaches an additional header and/or additional tail to the data packet. The encapsulated data packet is sent via the underlying public network (such as the Internet 104). Nodes of the underlying public network route the encapsulated data packet based on the additional header and/or additional tail. Nodes of the underlying public network may be but are not necessarily aware of the actual destination host to which the data packet is addressed. The receiving VPN endpoint (such as a VPN endpoint associated with the underlay network 110) receives the encapsulated data packet. The receiving VPN endpoint removes the additional header and/or additional tail. The receiving VPN endpoint inspects the original data packet to determine the destination host to which the data packet is addressed. The receiving VPN endpoint forwards the data packet towards the destination host. By way of encapsulation and decapsulation, a VPN tunnel is created, between the two VPN endpoints, through the underlying public network.

In an embodiment, a VPN endpoint is additionally configured to forward a data packet towards an internal network implemented by the underlay network 110. The VPN endpoint forwards the data packet towards the internal network via an additional tunnel (which is separate from the VPN tunnel described above). The data packet (after being decapsulated by a receiving VPN endpoint as described above) is addressed to an overlay address of a destination host connected to the internal network. The receiving VPN endpoint determines an underlay address of an underlay node that implements the destination host. The receiving VPN endpoint encapsulates the data packet using an additional header and/or additional tail. The additional header and/or tail includes the underlay address of the underlay node that implements the destination host. Nodes of the underlay network 110 route the encapsulated data packet based on the additional header and/or additional tail. The underlay node receives the encapsulated data packet. The underlay node removes the additional header and/or additional tail to obtain the original data packet. The original data packet is forwarded to the destination host.

A single VPN endpoint may provide connectivity between different clients and different internal networks. As an example, client 102a may transmit data corresponding to internal network 118a. Client 102b may transmit data corresponding to internal network 118b. Both client 102a and client 102b may transmit data addressed to an Endpoint Pool Address. The data from both client 102a and 102b may be forwarded to VPN endpoint 112a. VPN endpoint 112a may transmit the data from client 102a to internal network 118a. VPN endpoint 112a may transmit the data from client 102b to internal network 118b. Hence, VPN endpoint 112a establishes both (a) a direct virtual connection between client 102a and internal network 118a and (b) a direct virtual connection between client 102b and internal network 118b.

In an embodiment, a VPN endpoint is associated with one or more VPN sessions (such as sessions 114*a-d*). Prior to transmitting data packets from a client through a tunnel, a VPN endpoint performs authentication of the client. Authentication is achieved through the exchange of keys, passwords, and/or other data with the client. Successful authentication establishes a VPN session. During the VPN session, data packets from the authenticated client are permitted through the tunnel. The VPN session remains valid until a termination event occurs. As an example, a VPN session may terminate when a client logs out and/or times out.

Each VPN session is associated with a state (such as states 116*a-d*). A state includes attributes and/or parameters associated with the corresponding VPN session.

A state of a VPN session includes a session ID associated with the VPN session.

Additionally or alternatively, a state of a VPN session includes a client ID and/or tenant ID. A client ID identifies a client associated with the VPN session. The VPN session includes data packets transmitted from the client. A tenant ID identifies a tenant associated with the VPN session. The VPN session includes data packets transmitted from clients corresponding to the tenant.

Additionally or alternatively, a state of a VPN session includes parameters that are negotiated and/or configured for the VPN session. Such parameters may include a hashing algorithm, an encryption protocol, an authentication protocol, and/or other operations that are applied to data packets corresponding to the VPN session.

Additionally or alternatively, a state of a VPN session includes a session key that is used for encrypting, authenticating, and/or processing data corresponding to the VPN session. As an example, a state may include a key that is used for transmitting secure communications over an Internet Protocol Suite (IPSec) protocol.

Additionally or alternatively, a state of a VPN session includes a counter that counts the number of data packets, corresponding to the VPN session, that have been transmitted.

Additionally or alternatively, a state of a VPN session includes a parameter and/or attribute of the data packets of the VPN session. As an example, a state may include a number of bits and/or bytes that are included in a data packet.

In an embodiment, a VPN endpoint stores the states of the VPN sessions implemented by the VPN endpoint. As illustrated, for example, VPN endpoint 112*a* may implement sessions 114*a-b*. VPN endpoint 112*a* may store states 116*a-b*, which correspond to sessions 114*a-b*. VPN endpoint 112*a* may implement sessions 114*c-d*. VPN endpoint 112*b* may store states 116*c-d*, which correspond to sessions 114*c-d*.

In an alternative embodiment, a central repository stores the states of the VPN sessions implemented by multiple VPN endpoints. A VPN endpoint stores session IDs of the VPN sessions implemented by the VPN endpoint. The session IDs are used to index into the states of the VPN sessions stored at the central repository. As an example, VPN endpoint 112*a* may implement sessions 114*a-b*. VPN endpoint 112*a* may implement sessions 114*c-d*. States *a-d*, which correspond to session 114*a-d*, may be stored at a central repository. VPN endpoint 112*a* may store session IDs corresponding to sessions 114*a-b*. VPN endpoint 112*a* may retrieve states 116*a-b*, from the central repository, using the session IDs. VPN endpoint 112*b* may store session IDs corresponding to sessions 114*c-d*. VPN endpoint 112*b* may retrieve states 116*c-d*, from the central repository, using the session IDs.

In an embodiment, multiple VPN endpoints are associated with a same particular address (referred to as the "Endpoint Pool Address"). The multiple VPN endpoints form a VPN endpoint pool. Data that is addressed to the Endpoint Pool Address is distributed across the VPN endpoints of a VPN endpoint pool. The VPN endpoints operate concurrently to process data addressed to the Endpoint Pool Address.

In one or more embodiments, a VPN endpoint manager 108 refers to hardware and/or software configured to perform operations described herein for executing multiple VPN endpoints associated with an Endpoint Pool Address. A VPN endpoint manager 108 is implemented on one or more digital devices. Example operations for executing multiple VPN endpoints associated with an Endpoint Pool Address are described below with reference to FIGS. 3-5.

Figure 2:
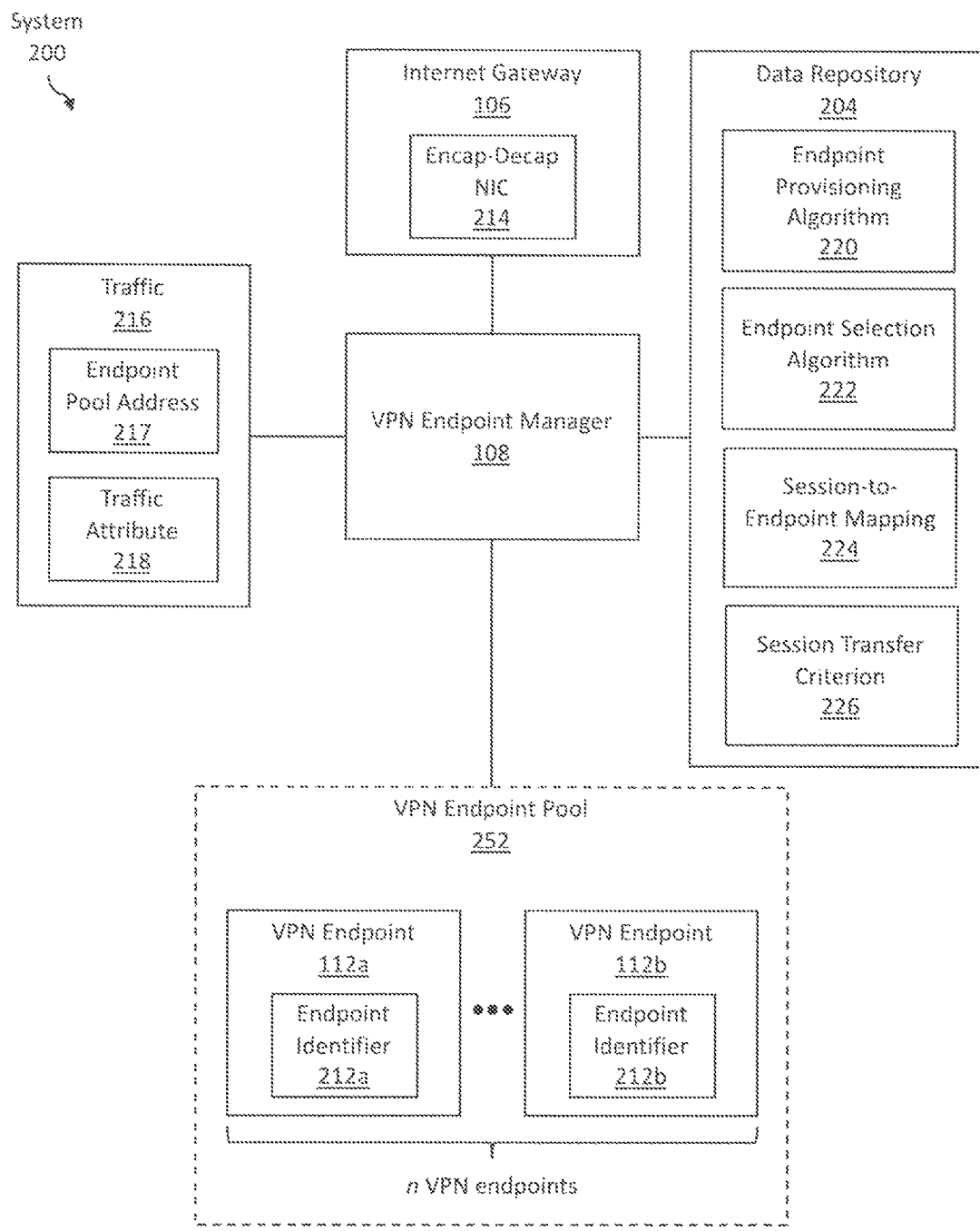
FIG. 2 illustrates a virtual private network (VPN) endpoint management system architecture, in accordance with one or more embodiments.

FIG. 2 illustrates a VPN endpoint management system architecture, in accordance with one or more embodiments. As illustrated in FIG. 2, the VPN endpoint management system 200 includes a VPN endpoint manager 202, a data repository 204, traffic 216, and a VPN endpoint pool 252. In one or more embodiments, the system 200 may include more or fewer components than the components illustrated in FIG. 2. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, traffic 216 includes data packets addressed to an Endpoint Pool Address 217. An Endpoint Pool Address 217 is a single address that is associated with or will be associated with multiple VPN endpoints. Data that is addressed to the Endpoint Pool Address 217 is distributed across the multiple VPN endpoints. The Endpoint Pool Address 217 may be but is not necessarily the same as an address of the Internet gateway 106.

Traffic 216 is associated with one or more traffic attributes 218. Traffic attribute 218 may include a level of the traffic 216. A level of the traffic 216 is a number of bits and/or bytes transmitted over a given period of time. Additionally or alternatively, traffic attribute 218 may include a latency sensitivity and/or jitter sensitivity of the traffic 216. As an example, voice data and/or video data may be more sensitive to latency and/or jitter than text data. Voice data and/or video data may be associated with high sensitivity level. Text data may be associated with a low sensitivity level. Additionally or alternatively, traffic attribute 218 may include a priority level of the traffic 216. As an example, traffic transmitted by a particular tenant may be associated with a high priority level. Traffic transmitted by another tenant may be associated with a low priority level. Additionally or alternatively, other traffic attributes 218 may be used.

A traffic attribute 218 may pertain to the overall traffic 216 addressed to an Endpoint Pool Address 217, such as a level of overall traffic addressed to the Endpoint Pool Address 217. Additionally or alternatively, a traffic attribute 218 may pertain to one or more individual data packets included in the traffic 216. As an example, a traffic attribute may be a priority level of a particular data packet included in the traffic.

In one or more embodiments, a VPN endpoint pool 252 includes a set of VPN endpoints (such as VPN endpoints 112*a*-112*b*) that are associated with a same Endpoint Pool Address 217. The VPN endpoint pool 252 includes n VPN endpoints, wherein the n is selected by a VPN endpoint manager 108. Each VPN endpoint is associated with a respective endpoint identifier (such as endpoint identifiers 212*a*-212*b*). The endpoint identifiers (IDs) are different from the Endpoint Pool Address 217.

In one or more embodiments, a data repository 204 is any type of storage unit and/or device (e.g., a file system, database, collection of tables, or any other storage mechanism) for storing data. Further, a data repository 204 may include multiple different storage units and/or devices. The multiple different storage units and/or devices may or may not be of the same type or located at the same physical site. Further, a data repository 204 may be implemented or may execute on the same computing system as a VPN endpoint manager 108. Alternatively or additionally, a data repository 204 may be implemented or executed on a computing system separate from a VPN endpoint manager 108. A data repository 204 may be communicatively coupled to a VPN endpoint manager 108 via a direct connection or via a network.

Information describing one or more endpoint provisioning algorithms 220, one or more endpoint selection algorithms 222, one or more session-to-endpoint mappings 224, and one or more session transfer criteria 226 may be implemented across any of components within the system 200. However, this information is illustrated within the data repository 204 for purposes of clarity and explanation.

In an embodiment, an endpoint provisioning algorithm 220 is used to select a quantity of VPN endpoints to be utilized for processing traffic 216 addressed to an Endpoint Pool Address 217. An endpoint provisioning algorithm 220 may select the quantity of VPN endpoints to be utilized based on the traffic attributes 218. As an example, a quantity of VPN endpoints to be utilized for processing the traffic may be selected based on a level of the traffic. In an embodiment, the selected quantity of VPN endpoints is directly proportional to a level of traffic.

In an embodiment, an endpoint selection algorithm 222 is used to select a VPN endpoint from a VPN endpoint pool 252 for processing traffic 216 corresponding to a particular VPN session. An endpoint selection algorithm 222 may be based on hashing, load balancing, traffic attributes 218, and/or other factors.

In an embodiment, a session-to-endpoint mapping 224 is a mapping between a VPN session and a VPN endpoint used for processing traffic of the VPN session. After an endpoint selection algorithm 222 is used to select a particular VPN endpoint for processing traffic 216 corresponding to a particular VPN session, a session-to-endpoint mapping between the particular VPN session and the particular VPN endpoint is stored. A session-to-endpoint mapping is stored for each current VPN session. One or more session-to-endpoint mappings may be stored in various formats, such as a table, a linked list, an array, a document, and an object.

In an embodiment, a session transfer criterion 226 is a condition used for determining whether a VPN session (such as sessions 114*a-d* of FIG. 1) is to be transferred from one VPN endpoint to another VPN endpoint. Whether a session transfer criterion 226 is satisfied may depend on the traffic attributes 218. Different session transfer criteria 226 may be applied to different VPN endpoints. As an example, a session transfer criterion of a particular VPN endpoint may be based on a level of traffic transmitted to the particular VPN endpoint. If the level of traffic transmitted to the particular VPN endpoint is greater than a specified threshold value, then the session transfer criterion may be determined as satisfied.

As described above, a VPN endpoint manager 108 refers to hardware and/or software configured to perform operations described herein for executing multiple VPN endpoints associated with an Endpoint Pool Address. The VPN endpoint manager 108 selects a quantity of VPN endpoints in a VPN endpoint pool 252. The VPN endpoint manager 108 may select the quantity of VPN endpoints by applying an endpoint provisioning algorithm 220 to a traffic attribute 218. Additionally or alternatively, the VPN endpoint manager 108 selects a particular VPN endpoint for processing data packets of a VPN session. The VPN endpoint manager 108 may select the VPN endpoint by using an endpoint selection algorithm 222 and/or a session-to-endpoint mapping 224. Additionally or alternatively, the VPN endpoint manager 108 transfers a VPN session from one VPN endpoint to another VPN endpoint. The VPN endpoint manager 108 may transfer a VPN session based on a session transfer criterion 226.

As described above, an Internet gateway 106 is a gateway and/or a router between an underlay network 110 and the Internet 104. In an embodiment, an Internet gateway 106 is associated with an encapsulation-decapsulation network interface card 214 (also referred to as an "encap-decap NIC"). The encap-decap NIC 214 is used to forward data packets, which are addressed to an Endpoint Pool Address, to a particular VPN endpoint. The encap-decap NIC 214 forwards the data packets to the particular VPN endpoint by encapsulating the data packets using an additional header and/or additional tail. The additional header and/or additional tail includes an address of the particular VPN endpoint. The additional header and/or additional tail may be referred to as an "Endpoint Pool Header."

The VPN endpoint manager 108 and the Internet gateway 106 may be implemented as a same component or as different components. The VPN endpoint manager 108 and the Internet gateway 106 may be implemented on a same digital device or on different digital devices.

3. Selecting a Quantity of VPN Endpoints for Processing Traffic

Figure 3:
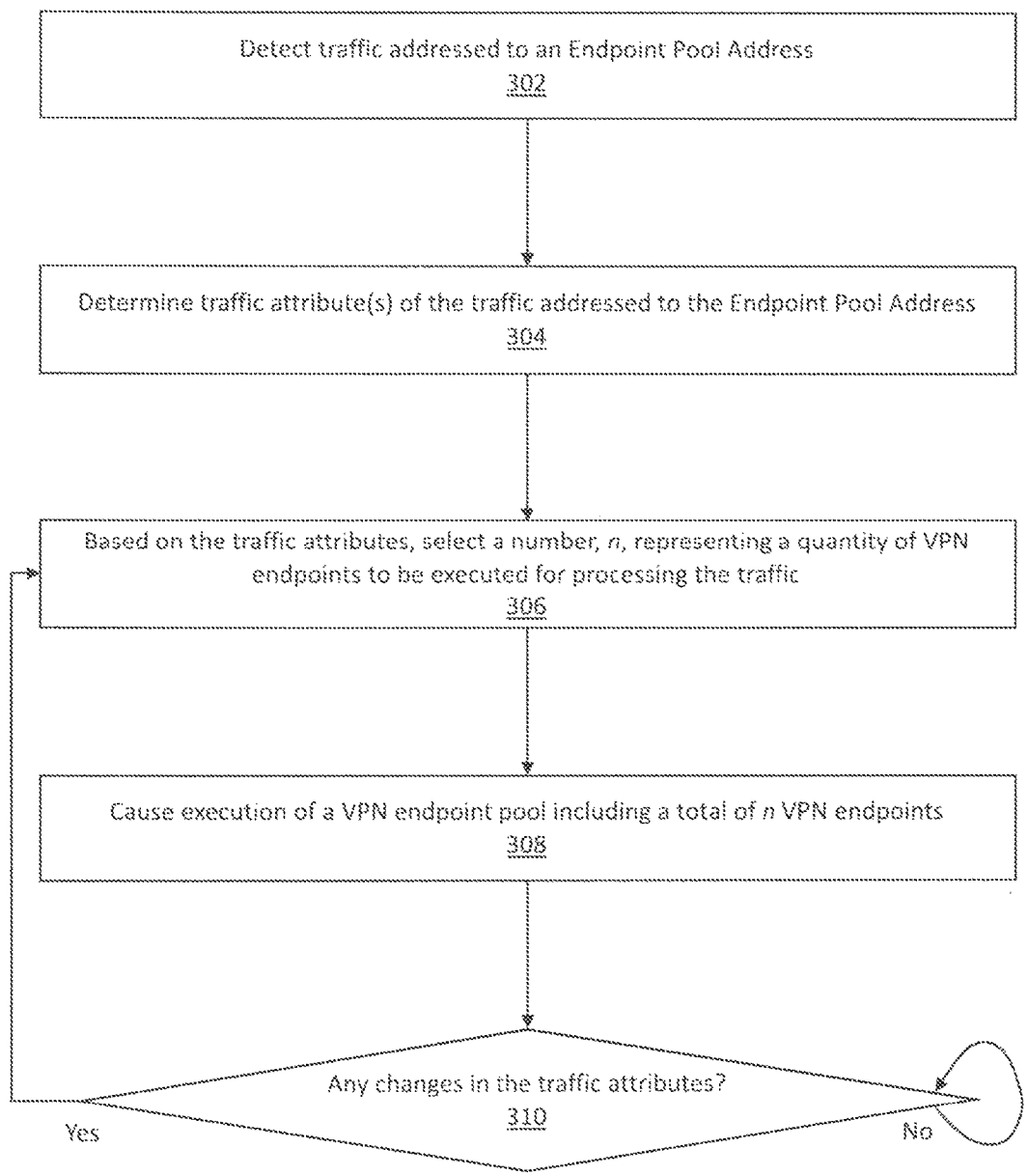
FIG. 3 illustrates an example set of operations for selecting a quantity of VPN endpoints, in a VPN endpoint pool, for processing traffic, in accordance with one or more embodiments.

FIG. 3 illustrates an example set of operations for selecting a quantity of VPN endpoints, in a VPN endpoint pool, for processing traffic, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include detecting traffic addressed to an Endpoint Pool Address (Operation 302). A VPN endpoint manager 108 monitors data packets transmitted through one or more Internet gateways to a particular computer network. The particular computer network is an underlay network that implements one or more internal networks.

The VPN endpoint manager 108 inspects the data packets to determine whether the data packets are addressed to the Endpoint Pool Address. The VPN endpoint manager 108 identifies a destination address included in each data packet. As an example, a destination address may be included in an outer header of a data packet. The VPN endpoint manager 108 detects data packets that identify the Endpoint Pool Address as the destination address.

One or more embodiments include determining one or more traffic attributes of the traffic addressed to the Endpoint Pool Address (Operation 304). The VPN endpoint manager 108 processes the traffic to determine one or more traffic attributes. Some examples of traffic attributes are described below. Additional and/or alternative traffic attributes may be used.

In an embodiment, a traffic attribute includes a level of traffic addressed to the Endpoint Pool Address. The VPN endpoint manager 108 detects traffic addressed to the Endpoint Pool Address over a particular period of time. The VPN endpoint manager 108 determines a number of bits included in the traffic addressed to the Endpoint Pool Address over the particular period of time. The number of bits divided by the particular period of time is determined as the level of the traffic addressed to the Endpoint Pool Address.

In an embodiment, a traffic attribute includes a level of traffic that (a) is addressed to the Endpoint Pool Address and (b) corresponds to a particular VPN session. The VPN endpoint manager 108 detects traffic addressed to the Endpoint Pool Address over a particular period of time. The VPN endpoint manager 108 identifies a subset of the traffic that corresponds to the particular VPN session. The VPN endpoint manager 108 may identify data packets corresponding to the particular VPN session based on a source address, session ID, and/or other attribute associated with the data packets. The VPN endpoint manager 108 determines a number of bits included in the subset of the traffic over the particular period of time. The number of bits divided by the particular period of time is determined as the level of the traffic that (a) is addressed to the Endpoint Pool Address and (b) corresponds to the particular VPN session.

In an embodiment, a traffic attribute includes a latency sensitivity and/or jitter sensitivity of traffic addressed to the Endpoint Pool Address. The VPN endpoint manager 108 detects traffic addressed to the Endpoint Pool Address. The VPN endpoint manager 108 identifies a subset of data packets that are associated with a high sensitivity level, and another subset of data packets that are associated with a low sensitivity level. Data packets associated with a high sensitivity level may be, for example, data packets including voice data and/or video data. Data packets associated with a low sensitivity level may be, for example, data packets including text data. An overall latency sensitivity and/or jitter sensitivity of the traffic addressed to the Endpoint Pool Address may be determined based on the number of data packets associated with a high sensitivity level and/or the number of data packets associated with a low sensitivity level.

In an embodiment, a traffic attribute includes a priority level of traffic addressed to the Endpoint Pool Address. The VPN endpoint manager 108 detects traffic addressed to the Endpoint Pool Address. The VPN endpoint manager 108 identifies a number of data packets associated with a high priority level and a number of data packets associated with a low priority level. Data packets associated with a high priority level may be, for example, data packets transmitted from a particular group of tenants (such as, tenants who have purchased enterprise-level services from the computer network). Data packets associated with a low priority level may be, for example, data packet transmitted from another group of tenants (such as, tenants who have purchased basic-level services from the computer network). An overall priority level of the traffic addressed to the Endpoint Pool Address may be determined based on the number of data packets associated with a high priority level and/or the number of data packets associated with a low priority level.

One or more embodiments include selecting a number, n, representing a quantity of VPN endpoints to be executed for processing the traffic, based on the traffic attributes (Operation 306). The VPN endpoint manager 108 retrieves an endpoint provisioning algorithm from a data repository. The VPN endpoint manager 108 inputs the traffic attributes to the endpoint provisioning algorithm. The endpoint provisioning algorithm includes one or more formulas, mappings, and/or rules. As an example, a formula may describe a directly proportional relationship between the level of the traffic and the quantity of VPN endpoints to be executed. The endpoint provisioning algorithm outputs a number, n, representing a quantity of VPN endpoints to be executed for processing the traffic.

One or more embodiments include causing execution of a VPN endpoint pool including a total of n VPN endpoints (Operation 308). The VPN endpoint manager 108 causes execution of n VPN endpoints, wherein n is determined at Operation 306. The VPN endpoints are executed by one or more nodes of the underlay network. As an example, a node of the underlay network may execute a virtual machine that executes a VPN endpoint.

The n VPN endpoints in the VPN endpoint pool are concurrently operational. One VPN endpoint in the VPN endpoint pool processes a subset of traffic addressed to the Endpoint Pool Address at the same time as another VPN endpoint in the VPN endpoint pool processes another subset of traffic addressed to the Endpoint Pool Address. If a VPN endpoint in the VPN endpoint pool fails to operate, then an additional VPN endpoint is executed to replace the failed VPN endpoint. Hence, the quantity of operational VPN endpoints in the VPN endpoint pool is maintained at n.

One or more embodiments include determining whether there are any changes in the traffic attributes (Operation 310). The VPN endpoint manager 108 continues to monitor traffic transmitted through one or more gateways to the underlay network, as described above with reference to Operation 302. The VPN endpoint manager 108 continues to determine traffic attributes of traffic addressed to the Endpoint Pool Address, as described above with reference to Operation 304. The VPN endpoint manager 108 may determine the traffic attributes on a periodic basis.

The VPN endpoint manager 108 modifies the quantity of VPN endpoints in the VPN endpoint pool based on the current traffic attributes. In an embodiment, the VPN endpoint manager 108 determines whether there are any changes in the traffic attributes. If there are any changes, then Operations 306-310 are iterated. In another embodiment, the VPN endpoint manager 108 iterates Operations 306-310 on a periodic basis, without inquiring whether there are any changes in the traffic attributes.

4. Transmitting Data Packets of a VPN Session to a Particular VPN Endpoint

Figure 4:
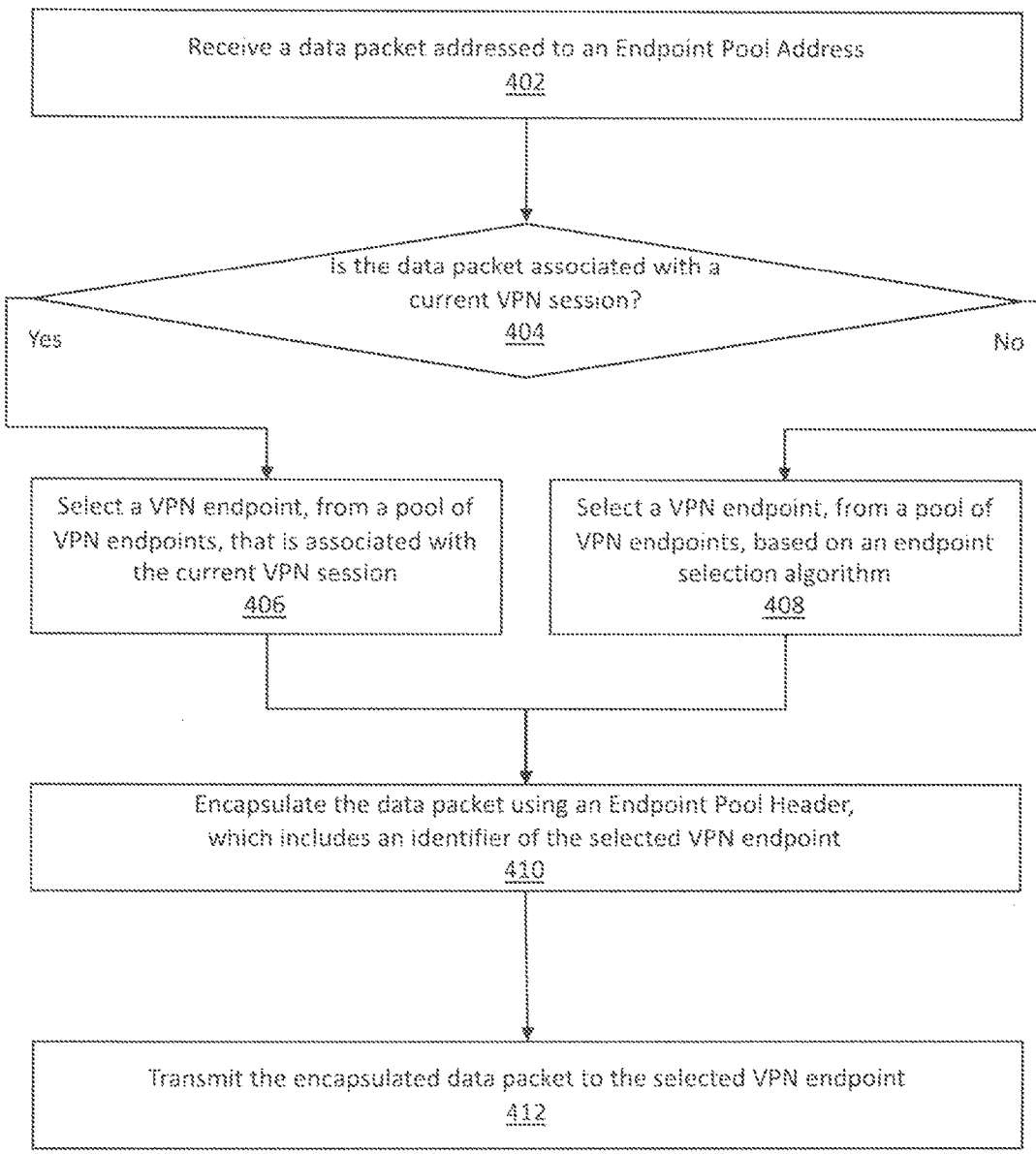
FIG. 4 illustrates an example set of operations for transmitting data packets of a VPN session to a particular VPN endpoint, in accordance with one or more embodiments.

FIG. 4 illustrates an example set of operations for transmitting data packets of a VPN session to a particular VPN endpoint, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include receiving a data packet addressed to an Endpoint Pool Address (Operation 402). An Internet gateway 106, which provides access to a particular computer network, receives a data packet. The particular computer network is an underlay network that implements one or more internal networks. The Internet gateway 106 identifies a destination address included in the data packet. As an example, a destination address may be included in an outer header of a data packet. The Internet gateway 106 determines that the data packet identifies the Endpoint Pool Address as the destination address.

In an embodiment, the data packet, including an outer header, is encapsulated traffic. The outer header was previously added during an encapsulation operation. The outer header includes the Endpoint Pool Address as a destination address.

One or more embodiments include determining whether the data packet is associated with a current VPN session (Operation 404). A current VPN session is a VPN session that is included in a set of session-to-endpoint mappings maintained at a data repository. A VPN endpoint manager 108 (which may be implemented as a same component as the Internet gateway 106, or may be a different component that is communicatively coupled to the Internet gateway 106) retrieves the set of session-to-endpoint mappings from the data repository. The VPN endpoint manager 108 also retrieves states corresponding to the VPN sessions included in the session-to-endpoint mappings. The VPN endpoint manager 108 may retrieve a session ID, client ID, session key, and/or other information included in a state.

The VPN endpoint manager 108 inspects the data packet received at Operation 402 to determine whether the data packet is associated with a VPN session included in the session-to-endpoint mappings. The VPN endpoint manager 108 may compare information included in the data packet to information included in a state of a VPN session to determine whether there is a match. As an example, a VPN endpoint manager may identify a source address included in a data packet. If the source address of the data packet is the same as a client ID corresponding to a particular VPN session, then the VPN endpoint manager may determine that the data packet is associated with the particular VPN session. If the source address of the data packet is not the same as client IDs corresponding to any current VPN sessions, then the VPN endpoint manager may determine that the data packet is not associated with any current VPN session.

If the data packet is associated with a current VPN session, the VPN endpoint manager 108 selects a VPN endpoint, from a pool of VPN endpoints, that is associated with the current VPN session (Operation 406). The VPN endpoint manager 108 identifies a session-to-endpoint mapping corresponding to the current VPN session. Based on the session-to-endpoint mapping, the VPN endpoint identifies and selects the VPN endpoint mapped to the current VPN session.

If the data packet is not associated with a current VPN session, the VPN endpoint manager 108 selects a VPN endpoint, from a pool of VPN endpoints, based on an endpoint selection algorithm (Operation 408). The data packet that is not associated with a current VPN session may be the first data packet that is being transmitted in the current VPN session. The VPN endpoint manager 108 retrieves an endpoint selection algorithm from a data repository. The VPN endpoint manager 108 executes the endpoint selection algorithm to select a VPN endpoint from the VPN endpoint pool.

As an example, the endpoint selection algorithm may include a hashing algorithm. The VPN endpoint manager may apply the hashing algorithm to the contents of the data packet. The result of the hashing algorithm is used to select a VPN endpoint.

As another example, the endpoint selection algorithm may attempt to balance the loads across the VPN endpoints in the VPN endpoint pool. The VPN endpoint manager may determine a load corresponding to each VPN endpoint in the VPN endpoint pool. The load of a VPN endpoint may be determined based on a number of VPN sessions already assigned to the VPN endpoint. Additionally or alternatively, the load of a VPN endpoint may be determined based on a level of traffic being transmitted to the VPN endpoint.

Continuing the example, the VPN endpoint manager may identify and select a VPN endpoint, in the VPN endpoint pool, that is associated with the least load. Additionally or alternatively, the VPN endpoint manager may identify and select a VPN endpoint that is associated with a load that is below a specified threshold value.

After a VPN endpoint is selected, the VPN endpoint manager 108 generates a new session-to-endpoint mapping. The new session-to-endpoint mapping is a mapping between (a) the VPN session corresponding to the data packet received at Operation 402 and (b) the selected VPN endpoint. The VPN endpoint manager 108 adds the new session-to-endpoint mapping to the set of session-to-endpoint mappings stored in the data repository.

One or more embodiments include encapsulating the data packet using an Endpoint Pool Header, which includes an identifier of the selected VPN endpoint (Operation 410). The Internet gateway 106 (and/or an encap-decap NIC 214 associated with the Internet gateway 106) generates an Endpoint Pool Header which includes an identifier of the selected VPN endpoint. The Internet gateway 106 attaches the Endpoint Pool Header to the data packet to generate an encapsulated data packet.

In an embodiment, as described above, the data packet includes an outer header that includes the Endpoint Pool Address. The Internet gateway 106 may attach the Endpoint Pool Header to the data packet, without removing the header that includes the Endpoint Pool Address. As a result, the encapsulated data packet may include the Endpoint Pool Header and the header that includes the Endpoint Pool Address. Alternatively, the Internet gateway 106 may first decapsulate the data packet so that the header including the Endpoint Pool Address is removed. The Internet gateway 106 may encapsulate the decapsulated data packet, attaching the Endpoint Pool Header. As a result, the encapsulated data packet may include the Endpoint Pool Header, without including the header that includes the Endpoint Pool Address.

One or more embodiments include transmitting the encapsulated data packet to the selected VPN endpoint (Operation 412). The Internet gateway 106 transmits the encapsulated data packet to the selected VPN endpoint via the underlay network. Nodes of the underlay network route the encapsulated data packet based on the Endpoint Pool Header, which includes the identifier of the selected VPN endpoint. The selected VPN endpoint is configured to remove the Endpoint Pool Header. The selected VPN endpoint is configured to identify a destination address included in the data packet. The selected VPN endpoint is configured to forward the data packet towards the destination address.

In an embodiment, the selected VPN endpoint is configured to perform authentication and/or encryption for traffic transmitted via the VPN established by the selected VPN endpoint. The selected VPN endpoint is configured to authenticate the client that transmitted the data packet. The selected VPN endpoint is configured to encrypt and/or decrypt the data packet.

In an embodiment, Operations 402-412 are iterated for each data packet addressed to the Endpoint Pool Address. The VPN endpoint manager 108 may select a different VPN endpoint for different data packets. One data packet, in the traffic addressed to the Endpoint Pool Address, may be transmitted to a particular VPN endpoint for processing. Another data packet, in the traffic addressed to the Endpoint Pool Address, may be transmitted to a different VPN endpoint for processing. The multiple VPN endpoints may process the respective data packets at the same time.

5. Transferring a VPN Session from One VPN Endpoint to Another VPN Endpoint

Figure 5:
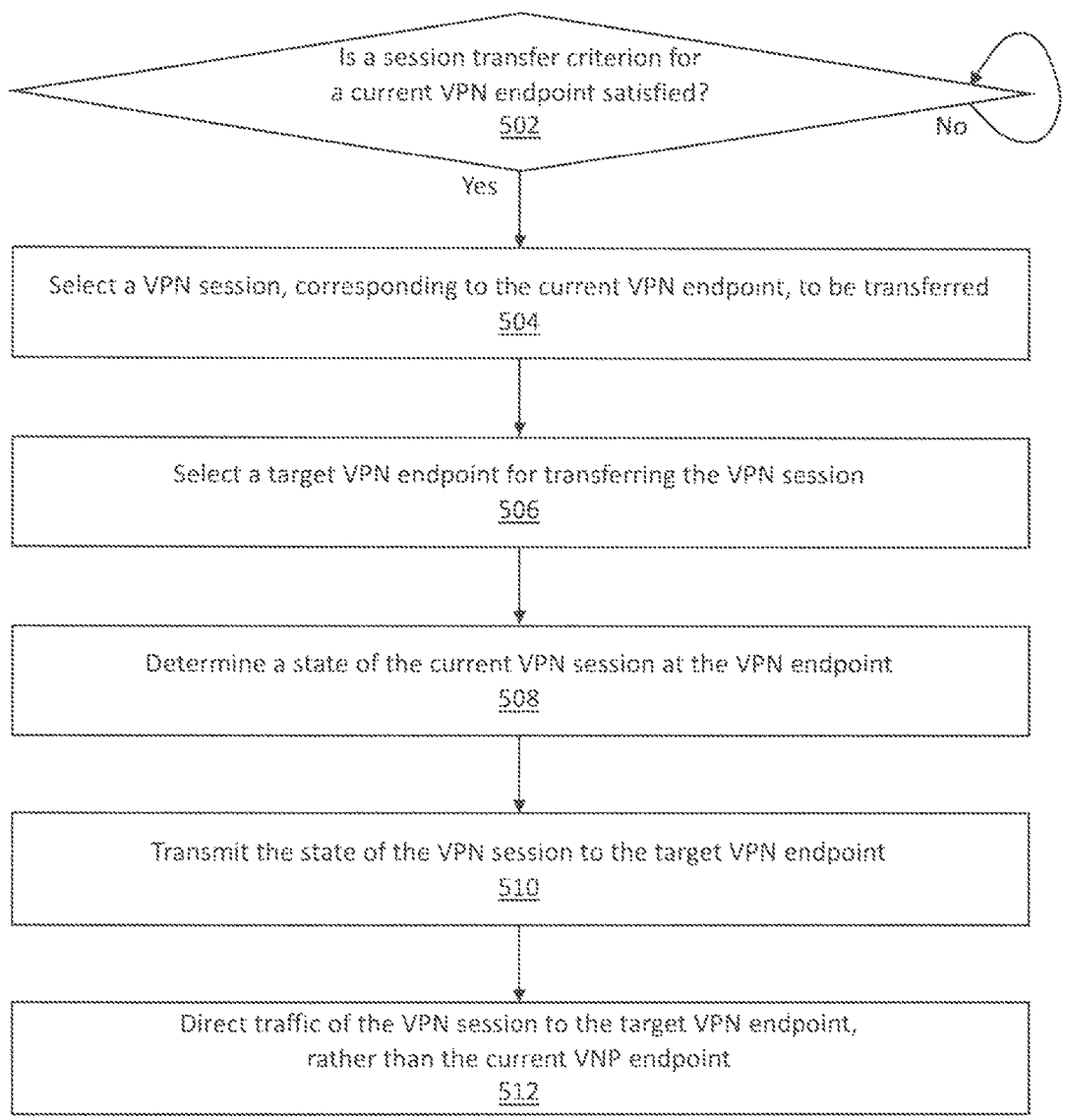
FIG. 5 illustrates an example set of operations for transferring a VPN session from one VPN endpoint to another VPN endpoint, in accordance with one or more embodiments.

As described above with reference to FIG. 4, a VPN endpoint manager 108 may select a particular VPN endpoint, in a VPN endpoint pool, for processing data packets corresponding to a VPN session. Subsequent to selecting the particular VPN endpoint for the VPN session, the VPN endpoint manager 108 may transfer the VPN session to a different VPN endpoint in the VPN endpoint pool. FIG. 5 illustrates an example set of operations for transferring a VPN session from a current VPN endpoint to a target VPN endpoint, in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

One or more embodiments include determining whether a VPN session transfer criterion for a current VPN endpoint is satisfied (Operation 502). A VPN endpoint manager 108 obtains the VPN session transfer criterion for the current VPN endpoint from a data repository. Additionally, the VPN endpoint manager 108 monitors traffic being transmitted to the current VPN endpoint. The VPN endpoint manager 108 determines traffic attributes of the traffic being transmitted to the current VPN endpoint, as described above with reference to Operation 304 of FIG. 3. The VPN endpoint manager 108 compares (a) the VPN session transfer criterion and (b) the traffic attributes.

In an embodiment, the VPN session transfer criterion is based on a level of traffic transmitted to the current VPN endpoint. As an example, if the level of traffic transmitted to the current VPN endpoint is greater than a specified threshold value, then the VPN endpoint manager may determine that the VPN session transfer criterion is satisfied.

In an embodiment, the VPN session transfer criterion is based on a priority level associated with traffic transmitted to the current VPN endpoint. As an example, if the priority level associated with at least a portion of the traffic transmitted to the current VPN endpoint is high, then the VPN endpoint manager may determine that the VPN session transfer criterion is satisfied.

One or more embodiments include identifying a VPN session, corresponding to the current VPN endpoint, to be transferred (Operation 504). The VPN endpoint manager 108 identifies the VPN sessions corresponding to the current VPN endpoint. The VPN endpoint manager 108 selects one or more VPN sessions to be transferred based on various rules, examples of which are described below.

In an embodiment, the VPN endpoint manager 108 selects a VPN session to be transferred based on the loads of the VPN sessions corresponding to the current VPN endpoint. As an example, the VPN endpoint manager 108 may select the VPN session associated with a highest load, as compared to the loads of all VPN sessions corresponding to the current VPN endpoint.

In an embodiment, the VPN endpoint manager 108 selects a VPN session to be transferred based on the priority levels of the VPN sessions corresponding to the current VPN endpoint. As an example, the VPN endpoint manager 108 may select the VPN session associated with a highest priority level, as compared to the priority levels of all VPN sessions corresponding to the current VPN endpoint.

One or more embodiments include selecting a target VPN endpoint for transferring the VPN session (Operation 506). In an embodiment, the VPN endpoint manager 108 selects an existing VPN endpoint, in the VPN endpoint pool, as the target VPN endpoint. The target VPN endpoint may be selected based on various criteria. As an example, the target VPN endpoint may be the VPN endpoint associated with a lowest load, as compared to the loads of all VPN endpoints in the VPN endpoint pool.

In an alternative embodiment, the VPN endpoint manager 108 initiates a new VPN endpoint. The VPN endpoint manager 108 initiates the new VPN endpoint in response to a determination that the number of VPN endpoints, in the VPN endpoint pool, needs to be incremented. Example operations for determining a number of VPN endpoints in a VPN endpoint pool are described above with reference to FIG. 3. The VPN endpoint manager 108 selects the new VPN endpoint as the target VPN.

The VPN endpoint manager 108 transmits a message and/or command to the current VPN endpoint and the target VPN endpoint. The message and/or command indicates an initiation of a transfer process, from the current VPN to the target VPN endpoint, for the VPN session identified at Operation 504.

One or more embodiments include determining a state of the VPN session at the current VPN endpoint (Operation 508). In an embodiment, each VPN endpoint stores the states of the VPN sessions implemented by the VPN endpoint. The VPN endpoint manager 108 retrieves the state of the VPN session to be transferred from a data repository associated with the current VPN endpoint.

Additionally, the VPN endpoint manager 108 freezes the state of the VPN session. The VPN endpoint manager 108 may transmit a message and/or command that prohibits the current VPN endpoint from making further changes to the state of the VPN session. Additionally or alternatively, the VPN endpoint manager 108 may set a flag that prohibits further changes to the state of the VPN session.

In an alternative embodiment, a central repository stores the states of the VPN sessions implemented by multiple VPN endpoints. The VPN endpoint manager 108 identifies the state of the VPN session to be transferred, which is stored at the central repository. The VPN endpoint manager 108 freezes the state of the VPN session. The VPN endpoint manager 108 may transmit a message and/or command that prohibits further changes to the state of the VPN session. Additionally or alternatively, the VPN endpoint manager 108 may set a flag that prohibits further changes to the state of the VPN session.

One or more embodiments include transmitting the state of the VPN session to the target VPN endpoint (Operation 510). In an embodiment, each VPN endpoint stores the states of the VPN sessions implemented by the VPN endpoint. The VPN endpoint manager 108 causes storage, at a data repository associated with the target VPN endpoint, of the state of the VPN session to be transferred. The VPN endpoint manager 108 causes deletion, from the data repository associated with the current VPN endpoint, of the state of the VPN session to be transferred.

In an alternative embodiment, a central repository stores the states of the VPN sessions implemented by multiple VPN endpoints. Each VPN endpoint stores a session ID of the VPN sessions implemented by the VPN endpoint. The VPN endpoint manager 108 causes storage, at a data repository associated with the target VPN endpoint, of the session ID of the VPN session to be transferred. The VPN endpoint manager 108 causes deletion, from the data repository associated with the current VPN endpoint, of the session ID of the VPN session.

One or more embodiments include directing traffic of the VPN session to the target VPN endpoint, rather than the current VPN endpoint (Operation 512). The VPN endpoint manager 108 retrieves, from a data repository, a session-to-endpoint mapping corresponding to the VPN session to be transferred. The session-to-endpoint mapping stored at the data repository is a mapping between the VPN session and the current VPN endpoint. The VPN endpoint manager 108 modifies the session-to-endpoint mapping to become a mapping between the VPN session and the target VPN endpoint. Based on the modified session-to-endpoint mapping, subsequent data packets of the VPN session are transmitted to the target VPN endpoint, rather than the current VPN endpoint. The VPN endpoint manager 108 also unfreezes the state of the VPN session.

Any data packets, of the VPN session to be transferred, that may be received between (a) determining the state of the VPN session at Operation 508 and (b) directing traffic of the VPN session to the target VPN endpoint at Operation 512 may be referred to as "in-flight data packets." In an embodiment, the VPN endpoint manager 108 processes the in-flight data packets in a way that is similar to the processing of any data packets addressed to the Endpoint Pool Address. The VPN endpoint manager 108 identifies a session-to-endpoint mapping corresponding to the VPN session of the in-flight data packets. At this point, the session-to-endpoint mapping has not yet been modified by Operation 512. Based on the session-to-endpoint mapping between the VPN session and the current VPN endpoint, the VPN endpoint manager 108 (and/or the Internet gateway 106 associated therewith) transmits the in-flight data packets to the current VPN endpoint. Since the state of the VPN session has been frozen, the current VPN endpoint does not process the in-flight data packets. Clients that transmitted the in-flight data packets will not receive any response. After a particular time period has passed and the clients still have not received any response, the clients may resend the data packets. At this point, Operation 512 may have been completed. Based on the modified session-to-endpoint mapping between the VPN session and the target VPN endpoint, the VPN endpoint manager 108 (and/or the Internet gateway 106 associated therewith) transmits the data packets to the target VPN endpoint.

Alternatively, various operations may be performed so that the in-flight data packets are not dropped. In an embodiment, the VPN endpoint manager 108 stores in-flight data packets in a queue until Operation 512 is completed. The in-flight data packets are not forwarded until Operation 512 is completed. Alternatively, the in-flight data packets are not forwarded until a threshold amount of time has passed, assuming that Operation 512 is completed within the threshold amount of time. Subsequently, the in-flight data packets are forwarded based on the modified session-to-endpoint mapping, which maps the VPN session to the target VPN endpoint.

In an embodiment, the VPN endpoint manager 108 transmits a message and/or command to the current VPN endpoint. The message and/or command instructs the current VPN endpoint to forward any in-flight data packets received by the current VPN endpoint to the target VPN endpoint. The message and/or command may be transmitted after selecting the target VPN endpoint at Operation 506. Alternatively, the message and/or command may be transmitted substantially at the same time as determining the state of the VPN session at Operation 508. Subsequently, the VPN endpoint manager 108 transmits any in-flight data packets to the current VPN endpoint according to the unmodified session-to-endpoint mapping. In accordance with the command, the current VPN endpoint forwards the in-flight data packets to the target VPN endpoint.

In an embodiment, Operations 502-512 may be iterated for multiple VPN sessions corresponding to the current VPN endpoints. Multiple VPN sessions may be transferred from a particular VPN endpoint to one or more target VPN endpoints. Additionally or alternatively, Operations 502-512 may be iterated with respect to different VPN endpoints. VPN sessions of different VPN endpoints may be transferred to one or more target VPN endpoints.

In an embodiment, clients transmitting the data packets of a transferred VPN session may be unaware of the transfer. The clients continue transmitting the data packets to the same Endpoint Pool Address. The VPN endpoint manager forwards the data packets to the current VPN endpoint or the target VPN endpoint, without necessarily informing the clients, based on Operations 502-512 as described above.

6. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 6A:
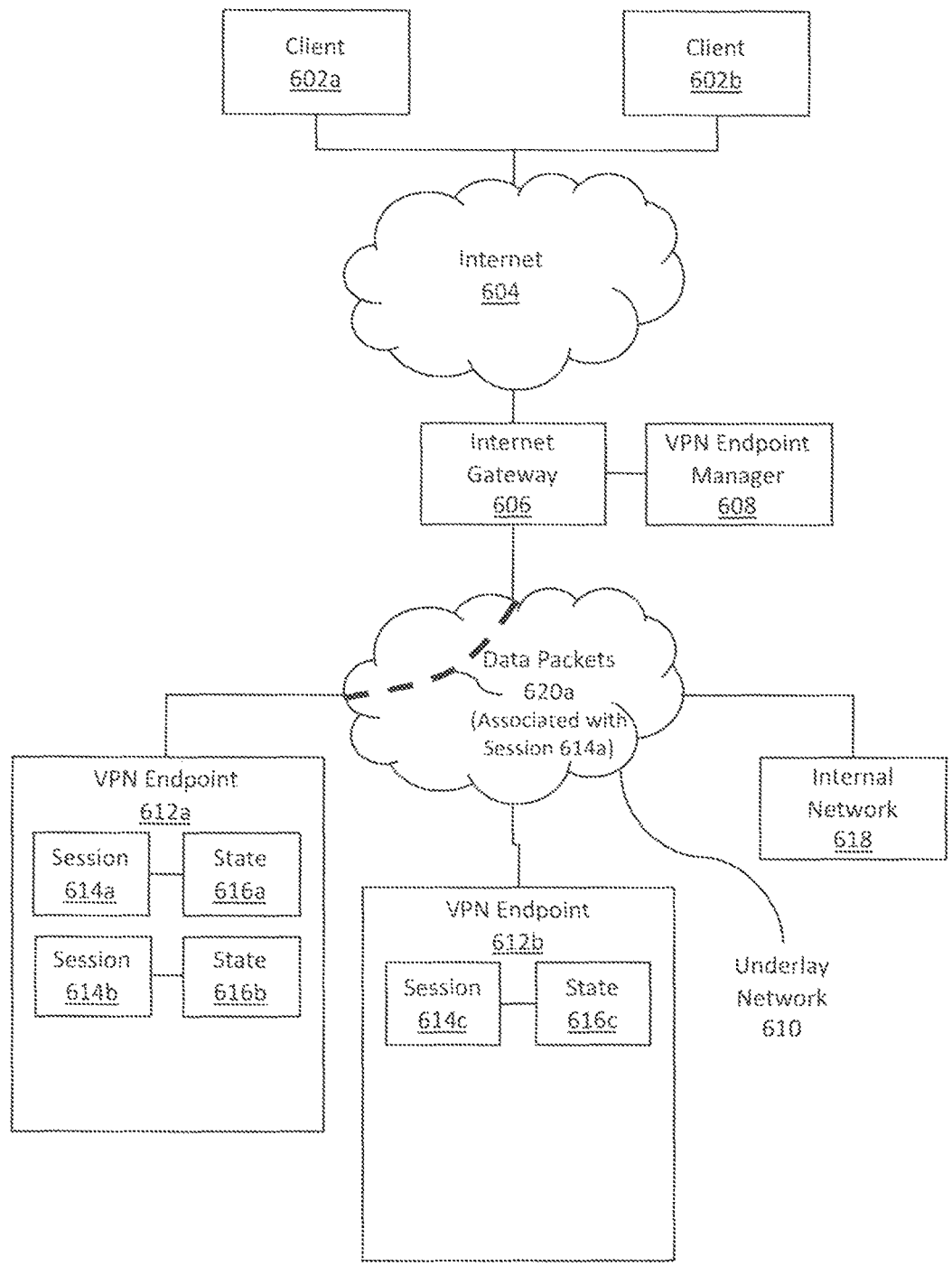
FIGS. 6A-6B illustrate examples for executing multiple VPN endpoints associated with an Endpoint Pool Address, in accordance with one or more embodiments.
Figure 6B:
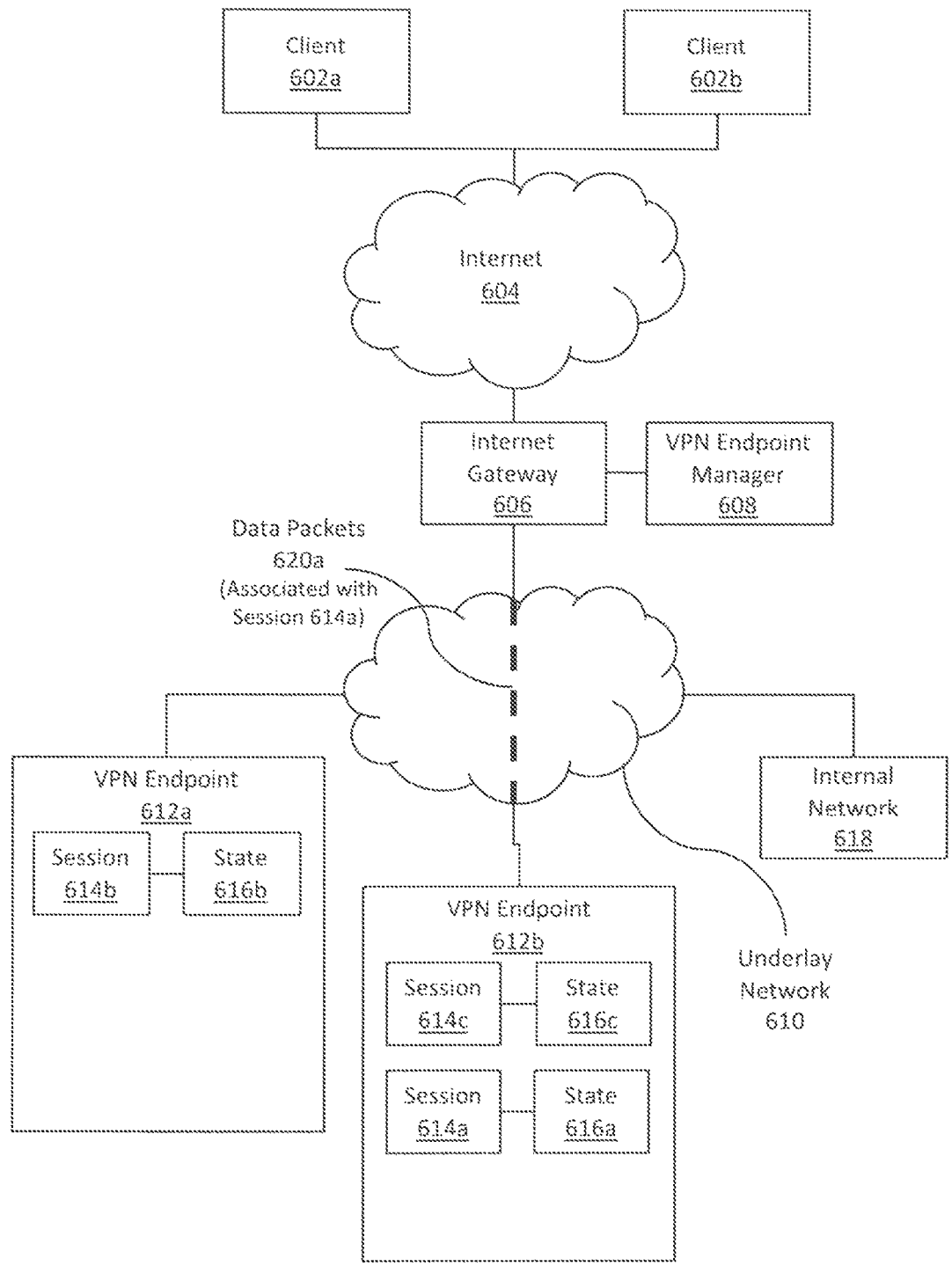

FIGS. 6A-6B illustrate examples for executing multiple VPN endpoints associated with an Endpoint Pool Address, in accordance with one or more embodiments. As illustrated in FIG. 6A, clients 602a-b are connected to the Internet 604. The Internet 604 is connected to an Internet gateway 606, which is communicatively coupled to a VPN endpoint manager 608. The Internet gateway 606 is connected to an underlay network 610. The underlay network implements an internal network 618 and VPN endpoints 612a-b.

The following description relates to selecting a quantity of VPN endpoints to be executed for processing traffic transmitted between the clients 602a-b and the underlay network 610. The VPN endpoint manager 608 detects traffic, from clients 602a-b, addressed to an Endpoint Pool Address. The VPN endpoint manager 608 determines a level of traffic addressed to the Endpoint Pool Address. The VPN endpoint manager 608 applies an endpoint provisioning algorithm to the level of traffic to determine that two VPN endpoints should be executed in the VPN endpoint pool. The VPN endpoint manager 608 causes the two VPN endpoints 612a-b to be executed. Nodes of the underlay network 610 execute VPN endpoints 612a-b.

The following description relates to transmitting data packets corresponding to a VPN session to a particular VPN endpoint of a VPN endpoint pool. The Internet gateway 606 receives a data packet 620a, associated with session 614a, from the client 602a. The VPN endpoint manager 608 identifies a source address included in the data packet. The source address is the client ID of the client 602a. The VPN endpoint manager 608 also identifies the current VPN sessions based on a set of session-to-endpoint mappings. The VPN endpoint manager 608 identifies the client IDs corresponding to the current VPN sessions. The VPN endpoint manager 608 determines that the client ID associated with the data packet 620a does not match the client IDs of any current VPN sessions. The VPN endpoint manager 608 applies a hashing algorithm on the data packet 620a. Based on the hashing algorithm, the VPN endpoint manager 608 selects VPN endpoint 612a for processing any data packets associated with session 614a. The VPN endpoint manager 608 adds a session-to-endpoint mapping between session 614a and VPN endpoint 612a to the set of session-to-endpoint mappings. The Internet gateway 606 (and/or an encap-decap NIC associated therewith) encapsulates the data packet 620a using an Endpoint Pool Header. The Endpoint Pool Header includes the address of VPN endpoint 612a. The encapsulated data packet is transmitted to VPN endpoint 612a via the underlay network 610.

Subsequently, the Internet gateway 606 receives another data packet 620a, associated with the same session 614a, from the client 602a. The VPN endpoint manager 608 identifies a source address included in the data packet. The VPN endpoint manager 608 identifies the client IDs corresponding to the current VPN sessions. The VPN endpoint manager 608 now determines that the client ID associated with the data packet 620a matches a client ID of a current VPN session (that is, session 614a). The VPN endpoint manager 608 determines that session 614a is mapped to VPN endpoint 612a. The VPN endpoint manager 608 selects VPN endpoint 612a for processing the data packet 620a. The Internet gateway 606 (and/or an encap-decap NIC associated therewith) encapsulates the data packet 620a using an Endpoint Pool Header. The Endpoint Pool Header includes the address of VPN endpoint 612a. The encapsulated data packet is transmitted to VPN endpoint 612a via the underlay network 610.

The VPN endpoint 612a is configured to process encapsulated data packets received via the underlay network 610. The VPN endpoint 612a removes the Endpoint Pool Header from the encapsulated data packets. The VPN endpoint 612a removes another header that includes the Endpoint Pool Address. The VPN endpoint 612a inspects the remaining data packet to determine that the data packet is addressed to the internal network 618. The VPN endpoint 612a encapsulates the data packet using an additional header. The additional header includes an underlay address of an underlay node that implements an overlay node of the internal network 618. The encapsulated data packet is transmitted to the overlay node via the underlay network 610.

Additionally, the VPN endpoint 612a maintains states of VPN sessions implemented by the VPN endpoint 612a. Each state includes a session ID, a client ID, and/or a session key associated with the corresponding VPN session. As illustrated, for example, the VPN endpoint 612a implements sessions 616a-b. The VPN endpoint 612a maintains the states 616a-b, corresponding to sessions 614a-b respectively. Meanwhile, the VPN endpoint 612b implements session 614c. The VPN endpoint 612b maintains the state 616c corresponding to session 614c.

The following description relates to transferring a VPN session from a current VPN endpoint to a target VPN endpoint. The VPN endpoint manager 608 monitors a level of traffic being transmitted to VPN endpoint 612a. The VPN endpoint manager 608 determines that the level of traffic exceeds a specified threshold value. The VPN endpoint manager 608 determines that the VPN sessions corresponding to VPN endpoint 612a includes session 614a and session 614b. The VPN endpoint manager 608 determines that the level of traffic associated with session 614a is higher than the level of traffic associated with session 614b. The VPN endpoint manager 608 select session 614a as a VPN session to be transferred from VPN endpoint 612a. The VPN endpoint manager 608 selects VPN endpoint 612b as a target VPN endpoint for transferring session 614a.

Referring to FIG. 6B, the VPN endpoint manager 608 determines a state 616a of session 614a at VPN endpoint 612a. The VPN endpoint manager 608 transmits a command, to VPN endpoint 612a, that prohibits VPN endpoint 612a from making further changes to the state 616a. The VPN endpoint manager 608 deletes the state 616a from VPN endpoint 612a. The VPN endpoint manager 608 transmits the state 616a to VPN endpoint 612b. Additionally, the VPN endpoint manager 608 modifies a session-to-endpoint mapping corresponding to session 614a. The modified session-to-endpoint mapping is between session 614a and VPN endpoint 612b. Based on the modified session-to-endpoint mapping, data packets 620a associated with session 614a are directed to VPN endpoint 612b, rather than VPN endpoint 612a.

The VPN endpoint manager 608 unfreezes the state 616a. The VPN endpoint 612b now implements session 614a. Further, the VPN endpoint 612b now maintains the state 616a.

Meanwhile, the VPN endpoint 612a continues to implement session 614b. The VPN endpoint 612a continues to maintain the state 616b. Additionally, the VPN endpoint 612b continues to implement session 614c. The VPN endpoint 612b continues to maintain the state 616c.

7. Computer Networks and Cloud Networks

In one or more embodiments, a computer network provides connectivity among a set of nodes. The set of nodes are connected by a set of links. The nodes may be local to and/or remote from each other. A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network (referred to as an "overlay node") is implemented by a respective node in the underlying network. Hence, each overlay node is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. A computer network and the network resources thereof are shared amongst multiple clients. Clients request computing services from network resources independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants.

In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
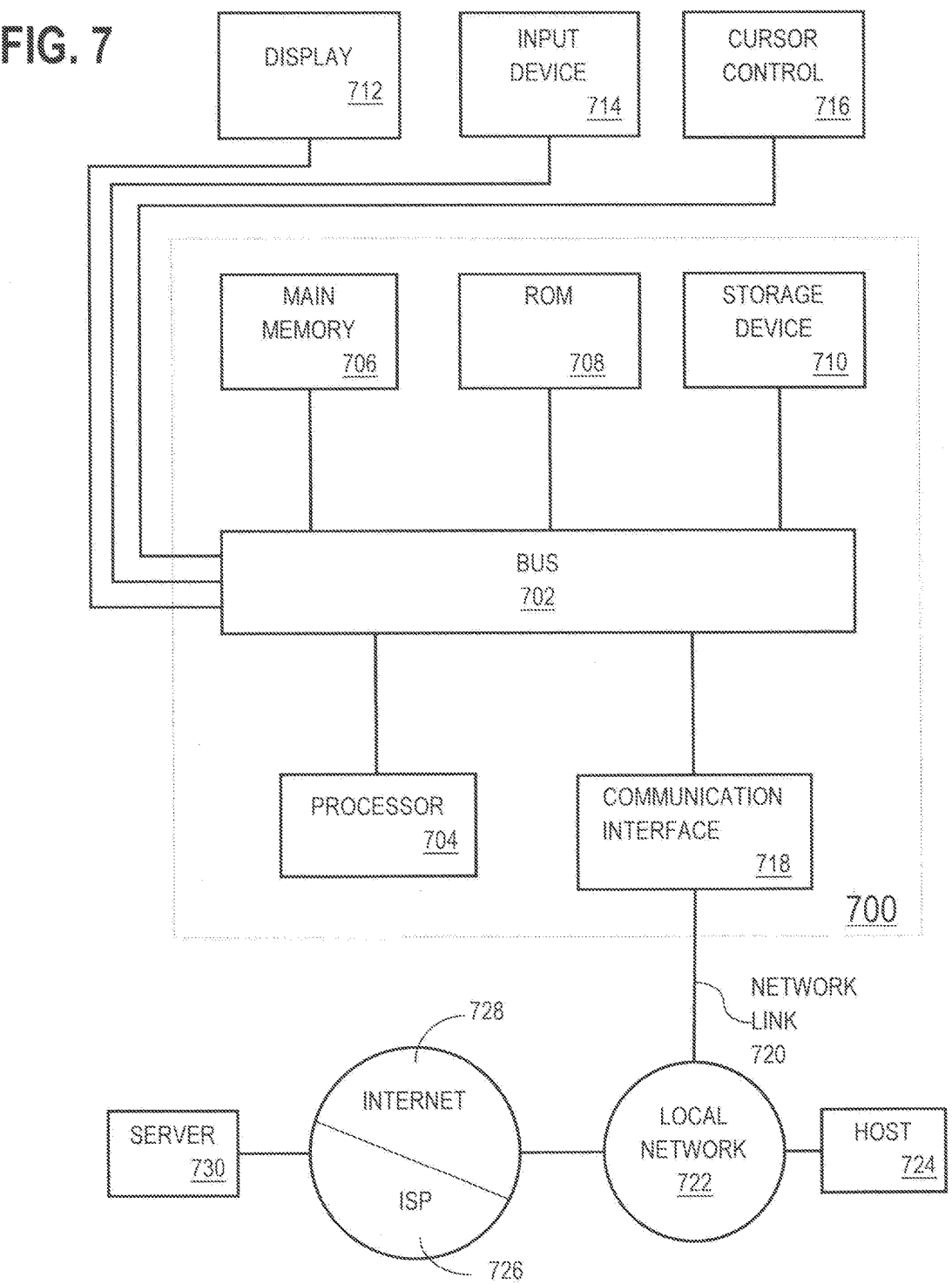
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   receiving, from a plurality of clients, traffic addressed to a particular destination address;
   determining a current level of the traffic;
   based on the current level of the traffic, selecting a first number representing a first quantity of Virtual Private Network (VPN) endpoints to be executed for processing the traffic;
   executing a plurality of VPN endpoints corresponding to the first quantity of VPN endpoints, wherein each of the plurality of VPN endpoints implements a respective VPN tunnel for processing at least a portion of the traffic addressed to the same particular destination address;
   responsive at least to determining that a first portion of the traffic, addressed to the particular destination address, corresponds to a current VPN session associated with a first VPN endpoint of the plurality of VPN endpoints:
      directing the first portion of the traffic to the first VPN endpoint of the plurality of VPN endpoints, wherein the first VPN endpoint decapsulates data packets in the first portion of the traffic;
   responsive at least to determining that a second portion of the traffic, addressed to the particular destination address, does not correspond to the current VPN session associated with the first VPN endpoint:
      directing the second portion of the traffic to a second VPN endpoint of the plurality of VPN endpoints, wherein the second VPN endpoint decapsulates data packets in the second portion of the traffic;
   subsequent to executing the plurality of VPN endpoints:
      determining a second level of the traffic, wherein the second level of the traffic is different than the current level of the traffic;
      based on the second level of the traffic, selecting a second number representing a second quantity of VPN endpoints to be executed for processing the traffic; and
      executing a second plurality of VPN endpoints corresponding to the second quantity of VPN endpoints.

2. The non-transitory computer readable medium of claim 1, wherein the second portion of the traffic is directed to the second VPN endpoint, of the plurality of VPN endpoints, while the first VPN endpoint is operational.

3. The non-transitory computer readable medium of claim 1, wherein the operations further comprise:
   obtaining a set of session-to-endpoint mappings;
   identifying a session-to-endpoint mapping corresponding to the current VPN session, from the set of session-to-endpoint mappings; and
   determining that the session-to-endpoint mapping maps the current VPN session to the first VPN endpoint.

4. The non-transitory computer readable medium of claim 1, wherein the operations further comprise:
   selecting the second VPN endpoint, for the second portion of the traffic, based on an endpoint selection algorithm.

5. The non-transitory computer readable medium of claim 4, wherein the operations further comprise:

storing a session-to-endpoint mapping between (a) a second VPN session corresponding to the second portion of the traffic and (b) the second VPN endpoint.

6. The non-transitory computer readable medium of claim 1, wherein the operations further comprise:
selecting the second VPN endpoint, for the second portion of the traffic, based on a load at each of the plurality of VPN endpoints.

7. The non-transitory computer readable medium of claim 1, wherein the operations further comprise:
receiving a data packet addressed to the particular destination address;
generating a header comprising an identifier of the first VPN endpoint;
encapsulating the data packet using the header; and
transmitting the encapsulated data packet to the first VPN endpoint.

8. The non-transitory computer readable medium of claim 1, wherein:
the traffic addressed to the particular destination address is received at one or more gateways of an underlay network;
the underlay network implements a first overlay network and a second overlay network;
the first VPN endpoint forwards the first portion of the traffic to the first overlay network; and
the second VPN endpoint forwards the second portion of the traffic to the second overlay network.

9. The non-transitory computer readable medium of claim 8, wherein the first VPN endpoint forwards the first portion of the traffic to the first overlay network by encapsulating data packets of the first portion of the traffic.

10. The non-transitory computer readable medium of claim 1, wherein the particular destination address is an Endpoint Pool Address.

11. The non-transitory computer readable medium of claim 1, wherein:
the first portion of the traffic is transmitted by a client, of the plurality of clients; and
the first VPN endpoint is configured to authenticate the client for transmitting the first portion of the traffic.

12. The non-transitory computer readable medium of claim 1, wherein:
the first portion of the traffic is encrypted by a client, of the plurality of clients; and
the first VPN endpoint decrypts the first portion of the traffic.

13. The non-transitory computer readable medium of claim 1, wherein:
the second portion of the traffic is directed to the second VPN endpoint, of the plurality of VPN endpoints, while the first VPN endpoint is operational;
the traffic addressed to the particular destination address is received at one or more gateways of an underlay network;
the underlay network implements a first overlay network and a second overlay network;
the first VPN endpoint forwards the first portion of the traffic to the first overlay network;
the second VPN endpoint forwards the second portion of the traffic to the second overlay network; and
the operations further comprise:
identifying a first session-to-endpoint mapping corresponding to the current VPN session, from a set of session-to-endpoint mappings;
responsive to determining that the first session-to-endpoint mapping maps the current VPN session to the first VPN endpoint: selecting the first VPN endpoint for processing the first portion of the traffic;
responsive to determining that a second VPN session, corresponding to the second portion of the traffic, is not included in the set of session-to-endpoint mappings: selecting the second VPN endpoint, based on an endpoint selection algorithm, for processing the second portion of the traffic;
storing a second session-to-endpoint mapping between (a) the second VPN session and (b) the second VPN endpoint, in the set of session-to-endpoint mappings;
generating a header comprising an identifier of the second VPN endpoint;
encapsulating a data packet, of the second portion of the traffic, using the header;
transmitting the encapsulated data packet to the second VPN endpoint;
subsequent to transmitting the encapsulated data packet to the second VPN endpoint: determining that a session transfer criterion associated with the second VPN endpoint is satisfied;
selecting a third second VPN endpoint, of the plurality of VPN endpoints, for transferring the second VPN session;
transmitting a state associated with the second VPN session to the third VPN endpoint; and
directing additional traffic associated with the second VPN session to the third VPN endpoint instead of the second VPN endpoint.

14. A system, comprising:
at least one device including a hardware processor; and
the system performs operations comprising:
receiving, from a plurality of clients, traffic addressed to a particular destination address;
determining a current level of the traffic;
based on the current level of the traffic, selecting a first number representing a first quantity of Virtual Private Network (VPN) endpoints to be executed for processing the traffic;
executing a plurality of VPN endpoints corresponding to the first quantity of VPN endpoints, wherein each of the plurality of VPN endpoints implements a respective VPN tunnel for processing at least a portion of the traffic addressed to the same particular destination address;
responsive at least to determining that a first portion of the traffic, addressed to the particular destination address, corresponds to a current VPN session associated with a first VPN endpoint of the plurality of VPN endpoints:
directing the first portion of the traffic to the first VPN endpoint of the plurality of VPN endpoints, wherein the first VPN endpoint decapsulates data packets in the first portion of the traffic;
responsive at least to determining that a second portion of the traffic, addressed to the particular destination address, does not correspond to the current VPN session associated with the first VPN endpoint:
directing the second portion of the traffic to a second VPN endpoint of the plurality of VPN endpoints, wherein the second VPN endpoint decapsulates data packets in the second portion of the traffic;
subsequent to executing the plurality of VPN endpoints:
determining a second level of the traffic, wherein the second level of the traffic is different than the current level of the traffic;

based on the second level of the traffic, selecting a second number representing a second quantity of VPN endpoints to be executed for processing the traffic; and executing a second plurality of VPN endpoints corresponding to the second quantity of VPN endpoints.

15. The system of claim 14, wherein the second portion of the traffic is directed to the second VPN endpoint, of the plurality of VPN endpoints, while the first VPN endpoint is operational.

16. A non-transitory computer readable medium comprising instructions which, when executed by one or more hardware processors, causes performance of operations comprising:

receiving, from a plurality of clients, encapsulated traffic addressed to a particular destination address;

determining a current level of the encapsulated traffic;

based on the current level of the encapsulated traffic, determining a first quantity of decapsulation endpoints to decapsulate the traffic;

executing a set of decapsulation endpoints including a number of decapsulation endpoints equal to the first quantity of decapsulation endpoints, wherein each of the set of decapsulation endpoints implements a respective tunnel for processing at least a portion of the encapsulated traffic addressed to the particular destination address;

directing a first portion of the encapsulated traffic to a first decapsulation endpoint of the set of decapsulation endpoints, wherein the first decapsulation endpoint decapsulates data packets in the first portion of the traffic;

directing a second portion of the encapsulated traffic to a second decapsulation endpoint of the set of decapsulation endpoints, wherein the second decapsulation endpoint decapsulates data packets in the second portion of the traffic;

subsequent to executing the set of decapsulation endpoints:

determining a second level of the encapsulated traffic, wherein the second level of the encapsulated traffic is different than the current level of the encapsulated traffic;

based on the second level of the encapsulated traffic, determining a second quantity of decapsulation endpoints to decapsulate the traffic; and executing a second set of decapsulation endpoints including a second number of decapsulation endpoints equal to the second quantity of decapsulation endpoints.

17. A non-transitory computer readable medium comprising instructions which, when executed by one or more hardware processors, causes performance of operations comprising:

receiving, from a plurality of clients, traffic addressed to a particular destination address;

determining a current level of the traffic;

based on the current level of the traffic, selecting a first number representing a first quantity of Virtual Private Network (VPN) endpoints to be executed for processing the traffic;

executing a plurality of VPN endpoints corresponding to the first quantity of VPN endpoints, wherein each of the plurality of VPN endpoints implements a respective VPN tunnel for processing at least a portion of the traffic addressed to the same particular destination address;

responsive at least to determining that a first portion of the traffic, addressed to the particular destination address, corresponds to a current VPN session associated with a first VPN endpoint of the plurality of VPN endpoints:

directing the first portion of the traffic to the first VPN endpoint of the plurality of VPN endpoints, wherein the first VPN endpoint decapsulates data packets in the first portion of the traffic;

responsive at least to determining that a second portion of the traffic, addressed to the particular destination address, does not correspond to the current VPN session associated with the first VPN endpoint:

directing the second portion of the traffic to a second VPN endpoint of the plurality of VPN endpoints, wherein the second VPN endpoint decapsulates data packets in the second portion of the traffic;

selecting a third VPN endpoint, of the plurality of VPN endpoints, for transferring the current VPN session;

transmitting a state associated with the current VPN session to the third VPN endpoint; and directing additional traffic associated with the current VPN session to the third VPN endpoint instead of the first VPN endpoint.

18. The non-transitory computer readable medium of claim 17, wherein selecting the third VPN endpoint, of the plurality of VPN endpoints, for transferring the current VPN session is responsive to determining that a session transfer criterion is satisfied.

* * * * *